(12) United States Patent
Bardapurkar et al.

(10) Patent No.: US 10,801,316 B2
(45) Date of Patent: Oct. 13, 2020

(54) MONITORING CEMENT SHEATH INTEGRITY USING ACOUSTIC EMISSIONS

(71) Applicant: Halliburton Energy Services, Inc., Houston, TX (US)

(72) Inventors: Sameer Bardapurkar, Pune (IN); Abhinandan Chiney, Pune (IN); Abhimanyu Deshpande, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 564 days.

(21) Appl. No.: 15/317,349

(22) PCT Filed: Sep. 22, 2014

(86) PCT No.: PCT/US2014/056781
§ 371 (c)(1),
(2) Date: Dec. 8, 2016

(87) PCT Pub. No.: WO2016/048267
PCT Pub. Date: Mar. 31, 2016

(65) Prior Publication Data
US 2017/0114626 A1    Apr. 27, 2017

(51) Int. Cl.
*G01V 1/50* (2006.01)
*E21B 47/005* (2012.01)
*E21B 47/14* (2006.01)
*G01V 1/52* (2006.01)

(52) U.S. Cl.
CPC ............ *E21B 47/005* (2020.05); *E21B 47/14* (2013.01); *G01V 1/50* (2013.01); *G01V 2001/526* (2013.01)

(58) Field of Classification Search
None
See application file for complete search history.

(56) References Cited

U.S. PATENT DOCUMENTS 3,291,247 A * 12/1966 Majani ..................... G01V 1/50
                                                    327/1
3,713,127 A    1/1973 Keledy et al.
(Continued)

OTHER PUBLICATIONS

Huang et al., "Using Acoustic Emission in Fatigue and Fracture Materials Research", JOM, vol. 50, No. 11, available online at http://www.tms.org/pubs/journals/JOM/9811/Huang/Huang-9811.html, Nov. 1998, 13 pages.
(Continued)

*Primary Examiner* — Hovhannes Baghdasaryan
(74) *Attorney, Agent, or Firm* — Kilpatrick Townsend & Stockton LLP (57) ABSTRACT

A system is provided that can include an acoustic emission sensor. The acoustic emission sensor can be positionable for detecting an acoustic emission from a cement sheath in a wellbore. The acoustic emission sensor can be operable to transmit a sensor signal associated with the acoustic emission. The system can also include a processing device in communication with the acoustic emission sensor. The system can further include a memory device in which instructions executable by the processing device are stored for causing the processing device to: receive the sensor signal; determine a characteristic associated with the sensor signal; and determine a structural integrity of the cement sheath based on the characteristic associated with the sensor signal.

20 Claims, 6 Drawing Sheets

(56) References Cited

U.S. PATENT DOCUMENTS

| | | |
|---|---|---|
| 7,681,450 B2 | 3/2010 | Bolshakov et al. |
| 7,787,327 B2 | 8/2010 | Tang et al. |
| 2005/0128873 A1 | 6/2005 | LaBry et al. |
| 2007/0211572 A1 | 9/2007 | Reiderman et al. |
| 2010/0206078 A1* | 8/2010 | Cheon ............... E02D 1/022 73/587 |
| 2014/0182845 A1 | 7/2014 | Roberson et al. |
| 2015/0198032 A1* | 7/2015 | Sinha ............... E21B 47/0005 166/250.01 |

OTHER PUBLICATIONS

Keshtgar et al., "Detecting Crack Initiation Based on Acoustic Emission", Chemical Engineering Transactions, vol. 33, The Italian Association of Chemical Engineering, 2013, pp. 547-552.

Kral et al., "Crack Propagation Analysis Using Acoustic Emission Sensors for Structural Health Monitoring Systems", Hindawi Publishing Corporation, The Scientific World Journal, vol. 2013, Article ID 823603, available online at http://dx.doi.org/10.1155/2013/823603, Aug. 20, 2013, 13 pages.

Liu, "Acoustic Emission and Crack Development in Rocks", The HKU Scholars Hub, Department of Civil Engineering, University of Hong Kong, available online at http://hdl.handle.net/10722/36112, Jun. 2000, 198 pages.

Mitchell et al., "Detecting Fatigue Cracks With Acoustic Emission", Proceedings of the Oklahoma Academy of Science, vol. 53, School of Aerospace, Mechanical, and Nuclear Engineering, University of Oklahoma, Norman, Oklahoma, 1973, pp. 121-126.

International Patent Application No. PCT/US2014/056781, International Search Report and Written Opinion dated Jun. 18, 2015, 14 pages.

* cited by examiner

MONITORING CEMENT SHEATH INTEGRITY USING ACOUSTIC EMISSIONS

CROSS-REFERENCE TO RELATED APPLICATIONS

This is a U.S. national phase under 35 U.S.C. 371 of International Patent Application No. PCT/US2014/056781, titled "MONITORING CEMENT SHEATH INTEGRITY USING ACOUSTIC EMISSIONS" and filed Sep. 22, 2014, the entirety of which is incorporated herein by reference.

TECHNICAL FIELD

The present disclosure relates generally to devices for use in well systems. More specifically, but not by way of limitation, this disclosure relates to monitoring cement sheath integrity using acoustic emissions.

BACKGROUND

A well system (e.g., oil or gas wells for extracting fluids from a subterranean formation) can include a wellbore drilled into a formation. A casing can be positioned in the wellbore to prevent walls of the wellbore from caving in. A cement sheath (i.e., a layer of cement) can be pumped into the space between the casing and the walls of the wellbore. The cement sheath can bond the casing to the walls of the wellbore. The cement sheath can also prevent fluid from one zone in the formation from traveling to another zone in the formation.

The cement sheath can fail (e.g., crack, debond, or structurally collapse) due to downhole pressures and other factors. When the cement sheath fails, well components can be damaged and well operations can be hindered. It can be challenging to monitor the structural integrity of a cement sheath in a wellbore.

DETAILED DESCRIPTION

Certain aspects and features of the present disclosure are directed to a system for monitoring cement sheath integrity using acoustic emissions. When a material (e.g., cement) becomes stressed, the material can emit an acoustic emission (i.e., an acoustic stress wave) in a specific frequency range. An acoustic emission sensor, such as a microphone, can be positioned to detect such acoustic emissions from a cement sheath in a wellbore. For example, the acoustic emission sensor can be positioned on or inside the cement sheath. The acoustic emission sensor can transmit a sensor signal associated with an acoustic emission to a computing device.

Figure 4:
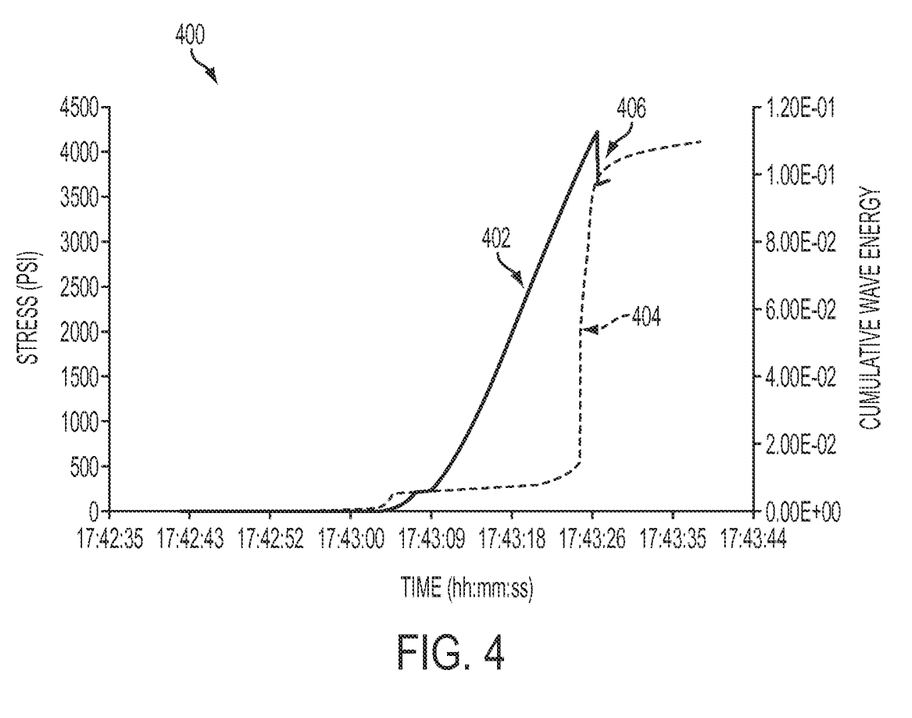
FIG. 4 is a graph depicting an example of the cumulative wave energy of multiple acoustic emissions used for monitoring cement sheath integrity according to one aspect of the present disclosure.

The computing device can receive the sensor signal from the acoustic emission sensor and determine a characteristic associated with the sensor signal. For example, the computing device can determine an amplitude, a duration, a frequency, a waveform, an amount of wave energy, or a cumulative wave energy associated with the sensor signal. Based on the characteristic, the computing device can determine the structural integrity of the cement sheath. For example, if there is a large change over a short period of time (e.g., as depicted in FIG. 4) in the cumulative wave energy, the computing device can determine that the cement sheath is approaching failure. As another example, if the number of sensor signals with amplitudes greater than a threshold suddenly increases, the computing device can determine that the cement sheath is approaching failure. In some aspects, the computing device can use one or both of the cumulative wave energy and the amplitudes of multiple sensor signals to determine the structural health of the cement sheath. The computing device can output a notification (e.g., an alarm or message to a well operator) if the cement sheath is approaching failure or has failed.

In some aspects, the system can include multiple acoustic emission sensors positioned to detect acoustic emissions from the cement sheath. The computing device can receive data from the multiple acoustic emission sensors. Using the data, the computing device can determine a location or other characteristic of a structural anomaly (e.g., a crack) in the cement sheath. For example, the multiple acoustic emission sensors can be positioned at known locations in a wellbore. The computing device can determine the time in which an acoustic emission is received by each of the multiple acoustic emission sensors. The computing device can use the times to determine the distances between the source of the acoustic emission (i.e., the structural anomaly that caused the acoustic emission) and each of the multiple acoustic emission sensors. The computing device can use the distances to determine (e.g., triangulate) the location of the structural anomaly in the cement sheath.

The system can help well operators determine the structural integrity of the cement sheath. By knowing when, where, and why the cement sheath may fail, well operators can take preventive or remedial measures. For example, a well operator can stop well operations, deploy safety equipment to a well location, or fix a cement sheath location that may be structurally weak.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
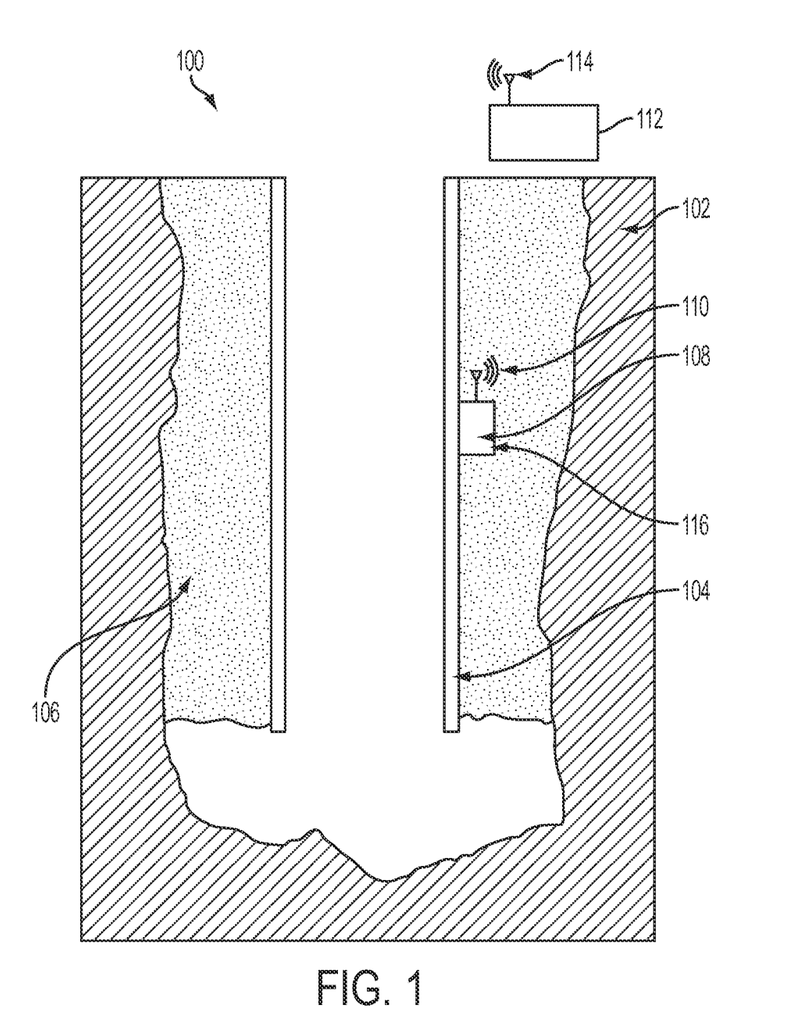
FIG. 1 is a schematic view of a system for monitoring cement sheath integrity using acoustic emissions according to one aspect of the present disclosure.

FIG. 1 is a schematic view of a well system 100 that can include a system for monitoring cement sheath integrity using acoustic emissions according to one aspect of the present disclosure. The well system 100 (e.g., an oil or gas well for extracting fluids from a subterranean formation) includes a wellbore drilled from a formation 102. The wellbore can include a casing 104. The casing 104 can include multiple connected tubes of the same length or different lengths, or the same diameter or different diameters, positioned in the wellbore. A cement sheath 106 can be positioned between the casing 104 and a wall of the wellbore. The well system 100 can also include other well components (not shown for clarity), such as a valve, a tubular string, a wireline, a slickline, a coiled tube, a bottom hole assembly, or a logging tool. The well component may or may not contact the cement sheath 106.

The well system 100 includes an acoustic emission sensor 108. The acoustic emission sensor 108 is acoustically coupled to (i.e., capable of detecting acoustic emissions from) the cement sheath 106. In the example shown in FIG. 1, the acoustic emission sensor 108 is positioned on the casing 104. The acoustic emission sensor 108, however, can be positioned anywhere in the well system 100 where the acoustic emission sensor 108 can detect acoustic emissions from the cement sheath 106. For example, the acoustic emission sensor 108 can be positioned on or inside the cement sheath 106. As another example, the acoustic emission sensor 108 can be positioned at a close enough distance to (but not on or inside) the cement sheath 106 to detect acoustic emissions from the cement sheath 106. In some examples, the acoustic emission sensor 108 can be positioned on a well component.

The cement sheath 106, when stressed, can output one or more acoustic emissions within a specific frequency range. For example, the cement sheath 106 can output an acoustic emission between 100 kHz and 150 kHz when stressed. The acoustic emission sensor 108 can be configured to detect one or more acoustic emissions from the cement sheath 106. The acoustic emission sensor 108 can include, for example, one or more of a microphone, an ultrasonic transducer, a piezoelectric transducer, a capacitive transducer, or any other device for converting pressure waves to electrical energy. In some aspects, the acoustic emission sensor 108 can include additional components. For example, the acoustic emission sensor 108 can include one or more of a preamplifier, an amplifier, a filter (e.g., low pass, band pass, or high pass), a signal conditioning unit, an analog-to-digital converter, a digital-to-analog converter, a processor, or a memory.

The acoustic emission sensor 108 can include a housing 116. The housing 116 can be configured to protect the acoustic emission sensor 108 from the downhole environment. For example, the housing can be configured to protect the acoustic emission sensor 108 from fluid, debris, high temperature, fluctuating temperatures, high pressure, or fluctuating pressures. The housing can include metal, rubber, plastic, or any combination of these.

The acoustic emission sensor 108 can transmit and receive data via a communication device 110. The communication device 110 can represent one or more of any components that facilitate a network connection. In the example shown in FIG. 1, the communication device 110 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other examples, the communication device 110 can be wired and can include interfaces such as Ethernet, USB, IEEE 1394, or a fiber optic interface.

The system can also include a data acquisition device (not shown). The data acquisition device can be configured to receive data from the acoustic emission sensor 108. The data acquisition device can receive data from, and transmit data to, the acoustic emission sensor 108 via a communication device (not shown). For example, the data acquisition device can include a communication device that can be configured substantially the same as the communication device 110 described above. In some aspects, the data acquisition device can receive data from, and transmit data to, a computing device 112. In some aspects, the system may not include the data acquisition device.

The system can include a computing device 112. The computing device 112 can be positioned at the wellbore surface, below ground, or offsite. The computing device 112 can include a processor interfaced with other hardware via a bus. A memory, which can include any suitable tangible (and non-transitory) computer-readable medium, such as RAM, ROM, EEPROM, or the like, can embody program components that configure operation of the computing device 112. In some aspects, the computing device 112 can include input/output interface components (e.g., a display, keyboard, touch-sensitive surface, and mouse) and additional storage.

The computing device 112 can transmit data to and receive data from the acoustic emission sensor 108 (and the data acquisition device) via a communication device 114. In some aspects, the communication device 114 can be configured substantially the same as the communication device 110 described above. An example of the computing device 112 is described in further detail with respect to FIG. 2.

Figure 2:
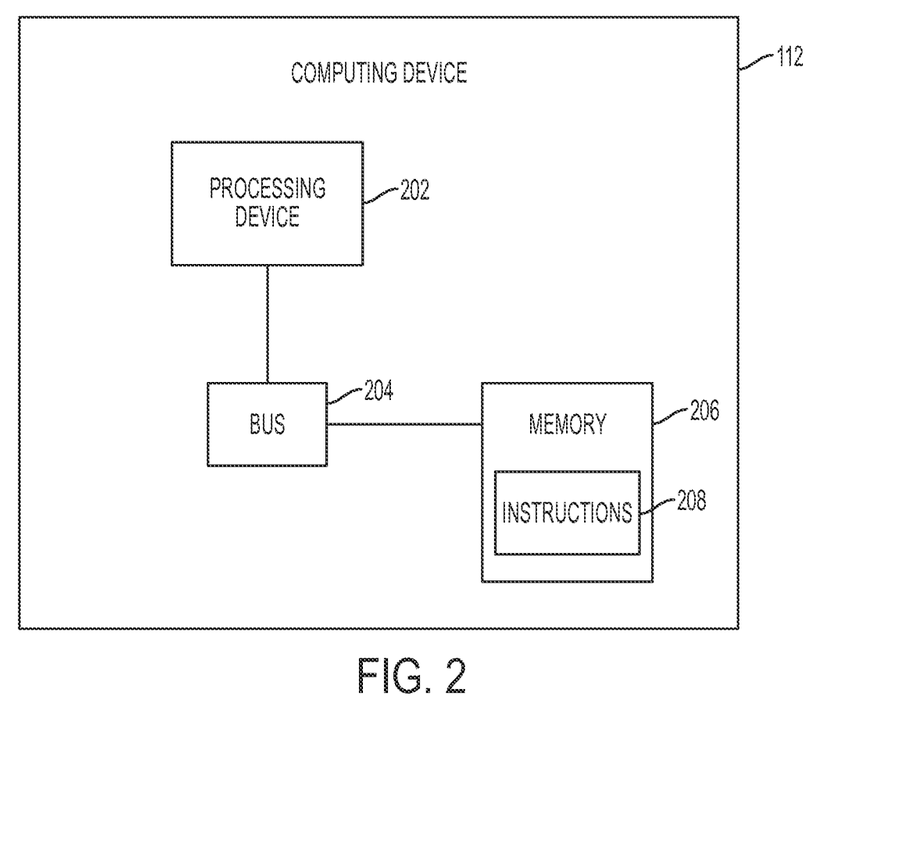
FIG. 2 is a block diagram depicting an example of a computing device for monitoring cement sheath integrity using acoustic emissions according to one aspect of the present disclosure.

FIG. 2 is a block diagram depicting an example of a computing device 112 for monitoring cement sheath integrity using acoustic emissions according to one aspect of the present disclosure. The computing device 112 includes a processing device 202, a memory device 206, and a bus 204.

The processing device 202 can execute one or more operations for monitoring cement sheath integrity using acoustic emissions. The processing device 202 can execute instructions 208 stored in the memory device 206 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessor, etc.

The processing device 202 can be communicatively coupled to the memory device 206 via the bus 204. The non-volatile memory device 206 may include any type of memory device that retains stored information when powered off. Non-limiting examples of the memory device 206 include electrically erasable and programmable read-only memory ("EEPROM"), flash memory, or any other type of non-volatile memory. In some aspects, at least some of the memory device 206 can include a medium from which the processing device 202 can read the instructions 208. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc.

Returning to FIG. 1, as noted above, the cement sheath 106 can output one or more acoustic emissions when stressed. The acoustic emission sensor 108 can detect the acoustic emissions and transmit data associated with the acoustic transmissions to the computing device 112.

The computing device 112 can receive the data from the acoustic emission sensor 108. Based on the data, the computing device 112 can determine if the acoustic emission resulted from the cement sheath 106 being stressed. For example, the computing device 112 can perform a Fourier transform on the data. A Fourier transform is a mathematical algorithm that can be applied to time-domain data to determine the frequency spectrum of the data. By performing a Fourier transform on the data from the acoustic emission sensor 108, the computing device 112 can determine the frequency spectrum of the data. The computing device 112 can analyze the frequency spectrum of the data to determine the dominant frequency components of the data. If the dominant frequency components of the data fall within a frequency range associated with the cement sheath 106 being stressed (e.g., a range from 100 kHz to 150 kHz), the computing device 112 can determine that the cement sheath 106 may be stressed.

As another example, the computing device 112 can determine the amplitude of the data received from the acoustic emission sensor 108. The computing device 112 can compare the amplitude of the data against a threshold. Lower amplitudes can be below the threshold. Higher amplitudes (e.g., resulting from the cement sheath 106 outputting acoustic emissions in close proximity to the acoustic emission sensor 108) can be above the threshold. Amplitudes above the threshold can be a "hit." In some examples, the threshold can be determined or calibrated by the system operator.

Figure 3:
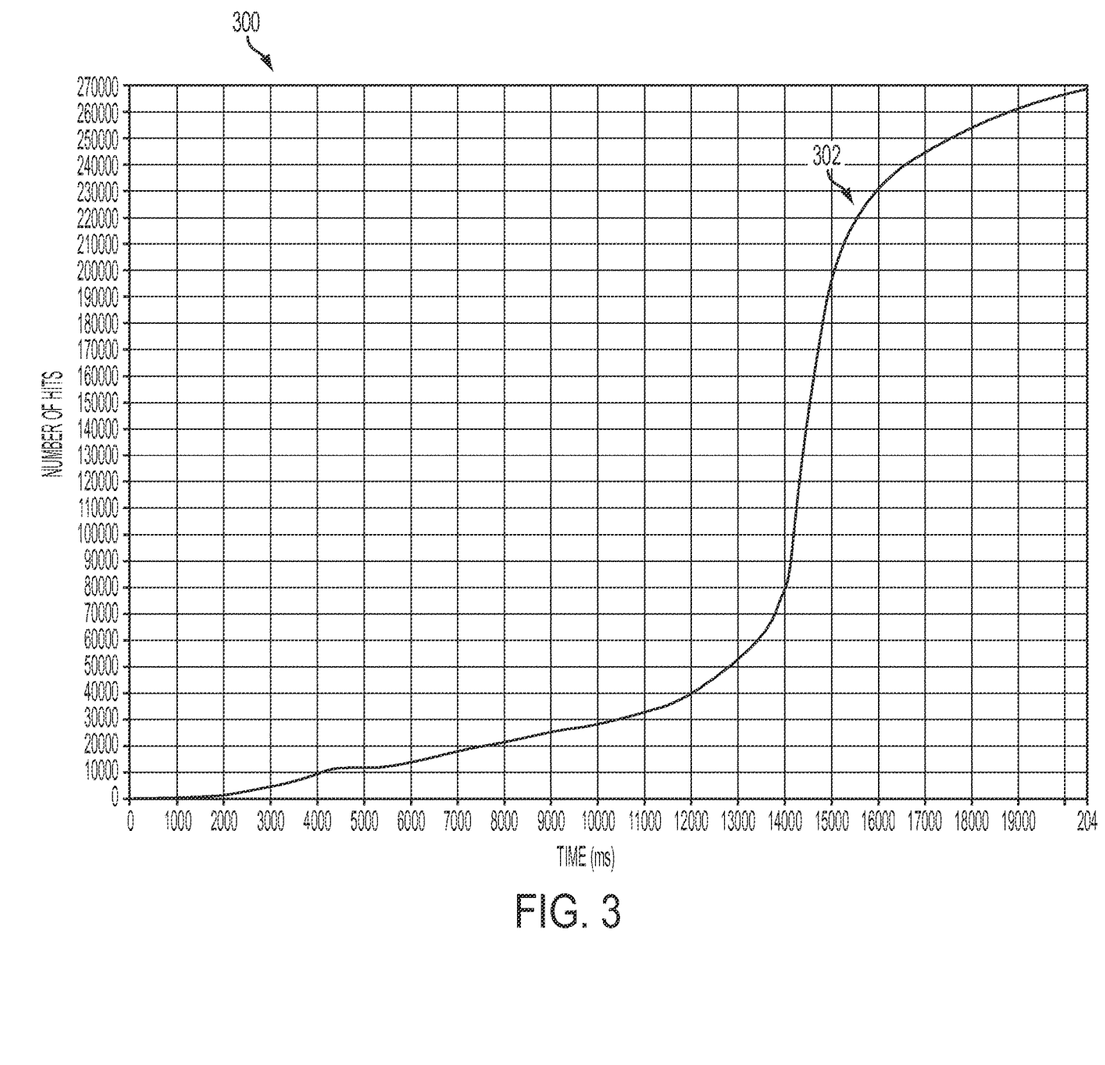
FIG. 3 is a graph depicting an example of the hit count from multiple acoustic emissions used for monitoring cement sheath integrity according to one aspect of the present disclosure.

In some aspects, if the computing device 112 detects one or more hits, the computing device 112 can determine that the cement sheath 106 may be stressed. For example, as the cement sheath 106 approaches failure, the cement sheath 106 can output an increased number of acoustic emissions. Each time the computing device 112 receives data from the acoustic emission sensor 108 that has an amplitude exceeding the threshold, the computing device 112 can detect a hit. The computing device 112 can further increase a counter (e.g., a "hit counter"). The computing device 112 can use the number of hits, and the time between hits, to determine if the cement sheath 106 is approaching failure. As depicted in FIG. 3, the number of hits can abruptly increase (e.g., approximately 400% in less than 3 seconds) as the cement sheath 106 approaches a point of failure 302. The computing device 112 can detect a change in the number of hits, or the amount of time between hits, and determine that the cement sheath 106 is approaching failure.

In some aspects, the computing device 112 can determine the structural health of the cement sheath 106 based on the cumulative wave energy of the data over an interval of time. The computing device 112 can determine the cumulative wave energy of the data over an interval of time by integrating the wave energy over the interval of time. The computing device 112 can determine the wave energy (E) over an interval of time from t to t+Δt by integrating the squares of the amplitudes (A) of the data during the time period Δt (i.e., $$\left(\text{i.e., } E = \int_{t}^{t+\Delta t} A^2 dt\right).$$

As depicted in FIG. 4, the cumulative wave energy 404 can abruptly increase (e.g., a 400% increase in less than 3 seconds) as the cement sheath 106 approaches a point of failure 406. The slope of the cumulative wave energy 405 can correspondingly abruptly increase. In some aspects, increasing stress 402 on the cement sheath 106 can cause the cement sheath 106 to fail. The computing device 112 can monitor the cumulative wave energy 404 for any such increases to determine if the cement sheath 106 is approaching failure.

Further, because different structural anomalies (e.g., cracking, grinding, debonding) in a material can emit unique frequency signatures, the computing device 112 can determine the type of structural anomaly that caused the acoustic emission. For example, an acoustic emission resulting from the debonding of the cement sheath 106 (e.g., from a wall of the wellbore) can have a dominant frequency that is different than an acoustic emission resulting from the cement sheath 106 cracking. By determining the dominant frequencies in an acoustic emission and comparing it against known frequency signatures, the computing device 112 can determine which type of structural anomaly may have caused the acoustic emission.

Figure 5:
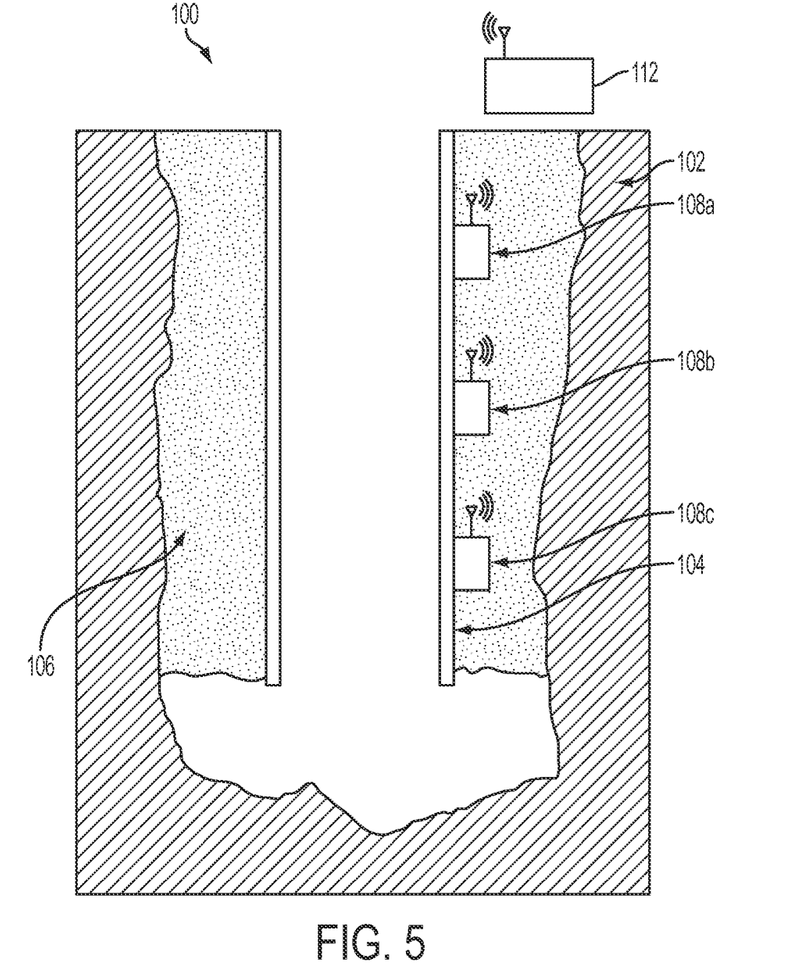
FIG. 5 is a schematic view of a system that includes multiple acoustic emission sensors for monitoring cement sheath integrity according to one aspect of the present disclosure.

FIG. 5 is a schematic view of a system that includes multiple acoustic emission sensors 108a-c for monitoring cement sheath integrity according to one aspect of the present disclosure. In this example, acoustic emission sensors 108a-c are positioned in the well system 100. Each of the acoustic emission sensors 108a-c can be in acoustic communication with to the cement sheath 106. The acoustic emission sensors 108a-c can be used alone or in combination to determine a characteristic associated with the structural health of the cement sheath 106.

In some aspects, the absolute positions of the acoustic emission sensors 108a-c, or the positions of the acoustic emission sensors 108a-c relative to one another in the well system 100, are known. For example, a well operator may position the acoustic emission sensors 108a-c in the wellbore in predetermined locations. Using data from two or more of the acoustic emission sensors 108a-c and their known positions, the computing device 112 can determine the location and the direction of propagation of an anomaly (e.g., a crack) in the cement sheath 106. For example, if the computing device 112 receives data associated with a crack in the cement sheath 106 from the acoustic emission sensor 108c, and then receives data associated with the crack from the acoustic emission sensor 108b, and then receives data associated with the crack from the acoustic emission sensor 108a, the computing device 112 may determine that the crack is propagating in the longitudinally upwards direction.

In some aspects, the acoustic emission sensors 108a-c can be positioned in the well system 100 in a predefined (e.g., triangular or circular) formation. The computing device 112 can use data received from the acoustic emission sensors 108a-c to determine (e.g., triangulate) the position of the anomaly in the cement sheath 106. For example, the computing device 112 can analyze amplitude data from the acoustic emission sensors 108a-c to determine the distance between the anomaly and each of the acoustic emission sensors 108a-c. Based on these distances and the known locations of the acoustic emission sensors 108a-c, the computing device 112 can determine the location of the anomaly in the cement sheath 106.

The computing device 112 can determine the structural health of the cement sheath 106 based on the direction of propagation and location of a structural anomaly. For example, the computing device 112 can determine that a structural anomaly is near or approaching a structurally critical part of the cement sheath 106. Based on this determination, the computing device 112 can determine that the cement sheath 106 is more likely to fail (or will fail sooner) than if, for example, the structural anomaly was near or approaching a less structurally critical part of the cement sheath 106.

Figure 6:
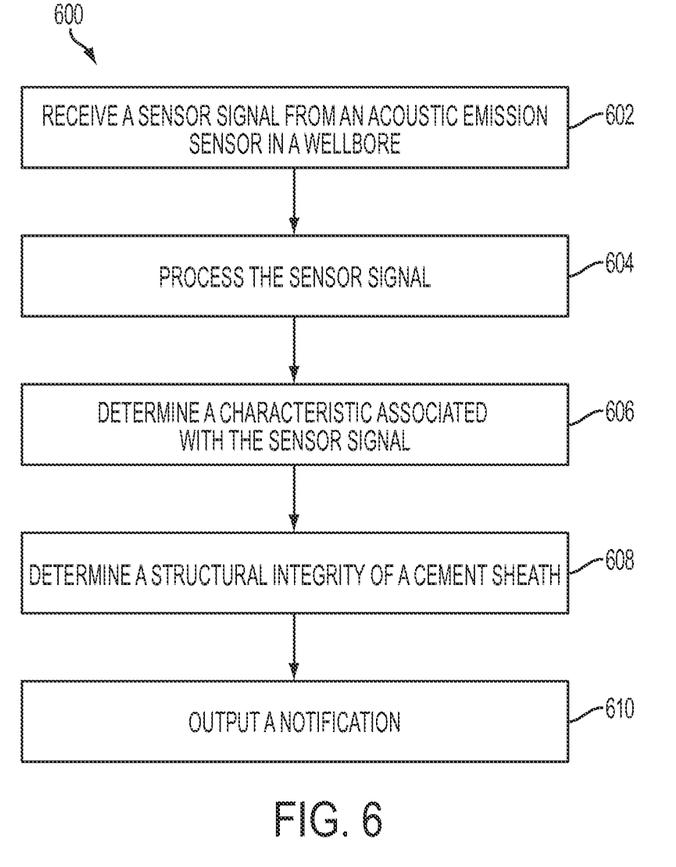
FIG. 6 is an example of a flow chart of a process for monitoring cement sheath integrity using acoustic emissions according to one aspect of the present disclosure.

FIG. 6 is an example of a flow chart of a process 600 for monitoring cement sheath integrity using acoustic emissions according to one aspect of the present disclosure. The process 600 below is described with reference to components described above with regard to computing device 112 shown in FIG. 2.

In block 602, a computing device 112 receives a sensor signal from an acoustic emission sensor in a wellbore. The sensor signal can be analog or digital. The sensor signal can be associated with ambient or stray noise in a wellbore. In some aspects, the sensor signal can be associated with a structural anomaly in a cement sheath in the wellbore.

In block 604, the sensor signal is processed. In some aspects, the sensor signal can be processed by the computing device 112 or via circuitry external to the computing device 112. Processing the sensor signal can include amplifying the sensor signal, filtering (e.g., low-pass, band-pass, or high-pass filtering) the sensor signal, inverting the sensor signal, performing one or more mathematical operations on the sensor signal (e.g., performing a Fourier transform of the sensor signal), improving the signal-to-noise ratio of the sensor signal, and otherwise preparing the sensor signal for use by the computing device 112.

In block 606, the computing device 112 determines a characteristic associated with the sensor signal. In some aspects, the computing device 112 can convert the sensor signal to a digital signal. For example, the sensor signal can be an analog signal. The computing device 112 can apply the sensor signal to an analog-to-digital converter. The analog-to-digital converter can periodically sample the sensor signal and output a series of digital values associated with the sensor signal. The computing device 112 can determine, directly or indirectly from the series of digital values, the characteristic (e.g., amplitude, duration, frequency, or waveform associated with the sensor signal). For example, the computing device 112 can perform a discrete Fourier transform (DFT) on the series of digital values to determine the dominant frequency or frequencies associated with the sensor signal.

In block 608, the computing device 112 can determine the structural integrity of a cement sheath in a wellbore based on the characteristic. For example, the computing device 112 can determine the structural integrity of the cement sheath based on one or both of the cumulative wave energy and the hit count associated with the sensor signal. In one example, if the cumulative wave energy increases beyond a threshold, the computing device 112 can determine that the cement sheath is approaching failure. As another example, if the hit count increases beyond a threshold within a predefined time period, the computing device 112 can determine that the cement sheath is approaching failure. In some aspects, the computing device 112 can use both the cumulative wave energy and the hit count to determine the structural integrity of the cement sheath. The computing device 112 can use both methods for redundancy or to improve accuracy. For example, the computing device 112 can detect an increase in hit counts in a short time period, and preliminarily determine that the cement sheath is approaching failure. The computing device 112 can then use the cumulative wave energy of the sensor signal to confirm whether the cement sheath is approaching failure.

In block 610, the computing device 112 can output a notification. For example, the computing device 112 can output the notification on a display (e.g., a computer monitor or a Liquid Crystal Display) associated with the computing device 112. The notification can include text, an icon, an image, a video, or an animation. In some aspects, the computing device 112 can output an audio notification via an associated speaker, or a haptic notification (e.g., a vibration) via an associated haptic output device (e.g., an Eccentric Rotating Mass). The notification can indicate that the cement sheath has failed or is going to fail.

In some aspects, the notification can prompt a well operator for a response. For example, the notification can ask the well operator whether he or she wants to stop or suspend certain well operations, execute a systems safety check, transmit a warning to other well operators, or perform another task. Upon receiving the response from the well operator, the computing device 112 can execute one or more functions associated with the response.

Figure 7:
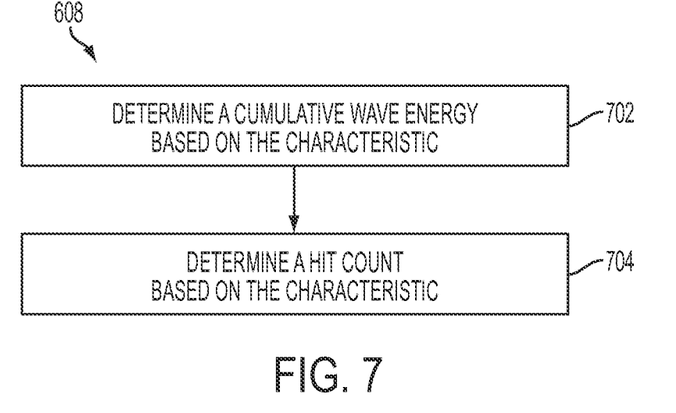
FIG. 7 is an example of a flow chart of a process for determining the structural integrity of a cement sheath according to one aspect of the present disclosure.

FIG. 7 is an example of a flow chart of a process 608 for determining the structural integrity of a cement sheath according to one aspect of the present disclosure.

In block 702, the computing device 112 determines a cumulative wave energy based on a characteristic of the sensor signal. For example, the computing device 112 can determine the wave energy (E) during a time period from t to t+Δt by integrating the squares of the amplitude (A) of the data during the time period Δt (i.e $$\left(\text{i.e } E = \int_{t}^{t+\Delta t} A^2 dt\right).$$

The computing device 112 can determine the cumulative wave energy by integrating the wave energy of the sensor signal over a period of time.

In block 704, the computing device 112 determines a hit count based on the characteristic. In some aspects, the computing device 112 can determine the hit count additionally or alternatively to determining the cumulative wave energy. The hit count can include the cumulative number of times amplitudes associated with multiple sensor signals exceed a threshold. The hit count can be stored in the memory device 206. The computing device 112 can determine the hit count by accessing a memory location in the memory device 206 associated with the hit count. If an amplitude associated with the sensor signal exceeds a threshold, the computing device 112 can increase the hit count (e.g., by 1). If the amplitude associated with the sensor signal does not exceed the threshold, the computing device 112 may not increase the hit count.

In some aspects, a system for monitoring cement sheath integrity using acoustic emissions is provided according to one or more of the following examples:

Example #1

A system can include an acoustic emission sensor that is positionable for detecting an acoustic emission from a cement sheath in a wellbore. The acoustic emission sensor can be operable to transmit a sensor signal associated with the acoustic emission. The system can also include a processing device in communication with the acoustic emission sensor. The system can further include a memory device in which instructions executable by the processing device are stored for causing the processing device to: receive the sensor signal; determine a characteristic associated with the sensor signal; and determine a structural integrity of the cement sheath based on the characteristic associated with the sensor signal.

Example #2

The system of Example #1 may feature the acoustic emission sensor being positioned on a casing or a well component contacting the cement sheath in the wellbore.

Example #3

The system of any of Examples #1-2 may feature the acoustic emission sensor including a housing operable to protect the acoustic emission sensor from fluid, high temperature, or high pressure in the wellbore.

Example #4

The system of any of Examples #1-3 may feature the acoustic emission sensor being included in a group of multiple acoustic emission sensors.

Example #5

The system of Example #4 may feature the multiple acoustic emission sensors being positioned for determining a propagation direction of an anomaly in the cement sheath.

Example #6

The system of any of Examples #4-5 may feature the multiple of acoustic emission sensors being positioned on a casing or a well component in the wellbore.

Example #7

The system of any of Examples #4-6 may feature the memory device further including instructions executable by the processing device for causing the processing device to: receive multiple of sensor signals from the multiple of acoustic emission sensors; and determine the structural integrity of the cement sheath based on the multiple of sensor signals.

Example #8

The system of any of Examples #1-7 may feature the characteristic including a cumulative wave energy, and the memory device further including instructions executable by the processing device for causing the processing device to: determine the structural integrity of the cement sheath by determining whether an increase in a slope of the cumulative wave energy exceeds a threshold.

Example #9

The system of any of Examples #1-8 may feature the memory device further including instructions executable by the processing device for causing the processing device to: determine, based on the characteristic, whether the acoustic emission is associated with cracking of the cement sheath, grinding of the cement sheath against an object, or debonding of the cement sheath from a wall of the wellbore.

Example #10

A system can include a processing device in communication with an acoustic emission sensor positionable in a wellbore for detecting an acoustic emission from a cement sheath. The system can also include a memory device in which instructions executable by the processing device are stored for causing the processing device to: receive a sensor signal from the acoustic emission sensor; and determine a characteristic associated with the cement sheath based on the sensor signal. The characteristic can be usable to determine a structural integrity of the cement sheath.

Example #11

The system of Example #10 may feature the acoustic emission sensor being positioned on a casing or a well component contacting the cement sheath in the wellbore.

Example #12

The system of any of Examples #10-11 may feature the acoustic emission sensor including a housing operable to protect the acoustic emission sensor from fluid, high temperature, or high pressure in the wellbore.

Example #13

The system of any of Examples #10-12 may feature the acoustic emission sensor being included in a group of multiple acoustic emission sensors.

Example #14

The system of Example #13 may feature the memory device further including instructions executable by the processing device for causing the processing device to: receive multiple of sensor signals from multiple of acoustic emission sensors; and determine the structural integrity of the cement sheath based on the multiple sensor signals.

Example #15

The system of any of Examples #10-14 may feature the characteristic including a cumulative wave energy, and the memory device further including instructions executable by the processing device for causing the processing device to: determine the structural integrity of the cement sheath by determining, based on the cumulative wave energy, whether an increase in the cumulative wave energy exceeds a threshold for a period of time.

Example #16

The system of any of Examples #10-15 may feature the characteristic including an amplitude, and the memory device further including instructions executable by the processing device for causing the processing device to: determine a hit count based on the amplitude; determine that an increase in the hit count exceeds a threshold for a period of time; determine, based on the increase in the hit count exceeding the threshold in the period of time, that the cement sheath is approaching a failure point; and output a notification to a well operator indicating that the cement sheath is approaching the failure point.

Example #17

The system of any of Examples #10-16 may feature the memory device further including instructions executable by the processing device for causing the processing device to:

determine, based on the characteristic, whether the acoustic emission is associated with cracking of the cement sheath, grinding of the cement sheath against an object, or debonding of the cement sheath from a wall of the wellbore.

Example #18

A method can include receiving, by a processing device, a sensor signal from an acoustic emission sensor in a wellbore. The acoustic emission sensor can be in acoustic communication with a cement sheath. The method can also include determining, by the processing device, a characteristic associated with the sensor signal. The method can further include determining, by the processing device, a structural integrity of the cement sheath based on the characteristic associated with the sensor signal.

Example #19

The method of Example #18 may feature outputting a notification indicating that the cement sheath has failed or is going to fail.

Example #20

The method of any of Examples #18-19 may feature determining the structural integrity of the cement sheath by: determining whether a cumulate wave energy associated with the sensor signal exceeds a threshold, or determining a hit count based on an amplitude of the sensor signal.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
a plurality of acoustic emission sensors positionable for detecting acoustic emissions originating from a cement sheath in a wellbore due to a structural anomaly in the cement sheath, wherein the plurality of acoustic emission sensors are operable to transmit sensor signals associated with the acoustic emission;
a processing device; and
a memory device in which instructions executable by the processing device are stored for causing the processing device to:
receive the sensor signals from the plurality of acoustic emission sensors, the sensor signals being associated with the acoustic emissions originating from the cement sheath due to a propagation of the structural anomaly;
determine a propagation direction of the structural anomaly in the cement sheath based on the sensor signals;
output a notification associated with the structural anomaly.

2. The system of claim 1, wherein an acoustic emission sensor among the plurality of acoustic emission sensors is positioned on a casing or a well component contacting the cement sheath in the wellbore.

3. The system of claim 1, wherein an acoustic emission sensor among the plurality of acoustic emission sensors comprises a housing operable to protect the acoustic emission sensor from fluid, high temperature, or high pressure in the wellbore.

4. The system of claim 1, wherein an acoustic emission sensor among the plurality of acoustic emission sensors is positioned on a well component and remotely from the cement sheath in the wellbore.

5. The system of claim 1, wherein the memory device further comprises instructions executable by the processing device for causing the processing device to:
determine a structural integrity of the cement sheath based on at least two sensor signals from among the sensor signals.

6. The system of claim 1, wherein the memory device further comprises instructions executable by the processing device for causing the processing device to:
determine a cumulative wave energy associated with the acoustic emissions; and
determine a structural integrity of the cement sheath by determining whether a change in a slope of the cumulative wave energy exceeds a threshold.

7. The system of claim 1, wherein the plurality of structural anomaly types includes cracking of the cement sheath, grinding of the cement sheath against an object, and debonding of the cement sheath from a wall of the wellbore.

8. A system, comprising:
a processing device; and
a memory device in which instructions executable by the processing device are stored for causing the processing device to:
receive a sensor signal from an acoustic emission sensor, the sensor signal corresponding to an acoustic emission detected by the acoustic emission sensor, the acoustic emission originating from a cement sheath in a wellbore due to a structural anomaly in the cement sheath;
determine a first location of the structural anomaly in the cement sheath based on the sensor signal;
compare the first location of the structural anomaly to a second location of a predefined subpart of the cement sheath to determine that the first location is within a predefined threshold distance of the second location; and
determine a structural health of the cement sheath based on the first location being within the predefined threshold distance of the second location.

9. The system of claim 8, wherein the acoustic emission sensor is positioned on a casing or a well component contacting the cement sheath in the wellbore.

10. The system of claim 8, wherein the acoustic emission sensor comprises a housing operable to protect the acoustic emission sensor from fluid, high temperature, or high pressure in the wellbore.

11. The system of claim 8, wherein the acoustic emission sensor is included in a plurality of acoustic emission sensors.

12. The system of claim 11, wherein the memory device further comprises instructions executable by the processing device for causing the processing device to:
receive a plurality of sensor signals from the plurality of acoustic emission sensors, the plurality of sensor signals corresponding to a plurality of acoustic emissions detected by the plurality of acoustic emissions sensors, the plurality of acoustic emissions originating from the cement sheath due to the structural anomaly in the cement sheath; and determine a propagation direction of the structural anomaly in the cement sheath based on the plurality of sensor signals.

13. The system of claim 8, wherein the memory device further comprises instructions executable by the processing device for causing the processing device to:
   determine a cumulative wave energy associated with the acoustic emission; and
   determine a structural integrity of the cement sheath by determining whether an increase in the cumulative wave energy exceeds a threshold for a period of time.

14. The system of claim 8, wherein the memory device further comprises instructions executable by the processing device for causing the processing device to:
   determine a hit count based on a plurality of acoustic emissions detected by the acoustic emission sensor during a time period, the plurality of acoustic emission originating from the cement sheath;
   determine that the hit count exceeds a threshold;
   determine that the cement sheath is approaching a failure point based on the hit count exceeding the threshold; and
   notify a well operator indicating that the cement sheath is approaching the failure point.

15. The system of claim 1, wherein the memory device further includes instructions that are executable by the processing device for causing the processing device to:
   determine a frequency signature of an acoustic emission based on at least one sensor signal among the sensor signals; and
   determine a type of the structural anomaly in the cement sheath by comparing the frequency signature of the acoustic emission to a plurality of frequency signatures corresponding to a plurality of structural anomaly types in cement sheaths, wherein the plurality of frequency signatures includes a first frequency signature corresponding to cracking of the cement sheath, a second frequency signature corresponding to grinding of the cement sheath against an object, and a third frequency signature corresponding to debonding of the cement sheath from a wall of the wellbore.

16. A method, comprising:
   receiving, by a processing device, sensor signals from a plurality of acoustic emission sensors in a wellbore, the sensor signals corresponding to acoustic emissions detected by the plurality of acoustic emission sensors, the acoustic emissions originating from a cement sheath in the wellbore due to a structural anomaly in the cement sheath;
   determining, by the processing device, a propagation direction of the structural anomaly in the cement sheath based on the sensor signals; and
   outputting, by the processing device, a notification associated with the structural anomaly.

17. The system of claim 8, wherein the acoustic emission sensor is remote from the cement sheath in the wellbore.

18. The system of claim 1, wherein the memory device further comprises instructions executable by the processing device for causing the processing device to:
   determine a first location of the structural anomaly in the cement sheath based on the sensor signals;
   compare the first location to a second location of a predefined subpart of the cement sheath to determine that the first location of the structural anomaly is within a predefined threshold distance of the second location of the predefined subpart of the cement sheath; and
   determine a structural health of the cement sheath based on the first location being within the predefined threshold distance of the second location.

19. The method of claim 16, further comprising:
   determining a specific location of the structural anomaly in the cement sheath based on the sensor signals;
   determining that the specific location of the structural anomaly is within a threshold distance of a predefined subpart of the cement sheath; and
   determining a structural health of the cement sheath based on the specific location of the structural anomaly being within the threshold distance of the predefined subpart of the cement sheath.

20. The method of claim 16, further comprising:
   determining a frequency signature of an acoustic emission based on a sensor signal among the sensor signals;
   determining a type of the structural anomaly in the cement sheath by comparing the frequency signature of the acoustic emission to a plurality of frequency signatures corresponding to a plurality of structural anomaly types in cement sheaths; and
   outputting a notification associated with the type of the structural anomaly.

* * * * *